(12) United States Patent
Su

(10) Patent No.: US 8,222,781 B2
(45) Date of Patent: Jul. 17, 2012

(54) OVERLOAD PROTECTION DEVICE FOR MOTOR

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 511 days.

(21) Appl. No.: 12/546,701

(22) Filed: Aug. 25, 2009

(65) Prior Publication Data

US 2011/0003644 A1    Jan. 6, 2011

(30) Foreign Application Priority Data

Jun. 29, 2009  (CN) .......................... 200910303817.5

(51) Int. Cl.
*H02K 11/00* (2006.01)
*H02P 3/00* (2006.01)

(52) U.S. Cl. .................... 310/75 R; 310/68 B; 192/150; 464/30

(58) Field of Classification Search ................ 310/68 B, 310/68 E, 75 R, 75 D, 78–79, 83; 340/648; 464/55, 61.1, 30, 37, 41, 56; 477/178; 192/150, 192/56.1, 56.5; 318/434, 475

See application file for complete search history.

(56) References Cited

U.S. PATENT DOCUMENTS

| 1,403,626 | A | * | 1/1922 | Potts | 318/452 |
| 1,920,017 | A | * | 7/1933 | McClatchie | 192/56.5 |
| 2,696,581 | A | * | 12/1954 | Peterson | 318/475 |
| 3,282,387 | A | * | 11/1966 | Becker et al. | 192/150 |
| 4,945,678 | A | * | 8/1990 | Berner et al. | 49/322 |

* cited by examiner

*Primary Examiner* — Burton Mullins
(74) *Attorney, Agent, or Firm* — Altis Law Group, Inc.

(57) ABSTRACT

An overload protection device includes a motor, a rotatable shaft, a driven wheel, and a transmission mechanism. The rotatable shaft is meshed with the motor. The rotatable shaft includes a rod and a driving arm. A connection pole is formed on the driving arm. An inner surface of the driven wheel forms a protrusion. A sidewall of the protrusion defines a cutout therein. The transmission mechanism includes a resilient member and two arms rotatably connected on the connecting pole. The transmission mechanism is wedged in the cutout. when the motor is overloaded, the torque applied on the arms by the drive force of the motor becomes greater than the torque applied on the arms by the resilient force of the resilient member, the resilient member can no longer hold the transmission mechanism in a wedge shape, the arms become parallel each other to slide out of the cutout.

7 Claims, 3 Drawing Sheets

OVERLOAD PROTECTION DEVICE FOR MOTOR

BACKGROUND

1. Technical Field

The present disclosure relates to overload protection devices and, particularly, to an overload protection device for a motor.

2. Description of the Related Art

Motors are used for converting electrical energy into mechanical energy. When a motor is overloaded, the electrical current to the motor increases sharply and the coil temperature of the motor rises rapidly, as a result, the coil may become damaged or even burnt out.

Therefore, it is desirable to provide an overload protection device which can overcome the above-mentioned problems.

BRIEF DESCRIPTION OF THE DRAWINGS

Many aspects of the present overload protection device for a motor could be better understood with reference to the accompanying drawings. The components in the drawings are not necessarily drawn to scale, the emphasis instead being placed upon clearly illustrating the principles of the overload protection device for a motor. Moreover, in the drawings, like reference numerals designate corresponding parts throughout the several views.

DETAILED DESCRIPTION

Embodiments of the present overload protection device 100 for a motor will be now described in detail with reference to the drawings.

Figure 1:
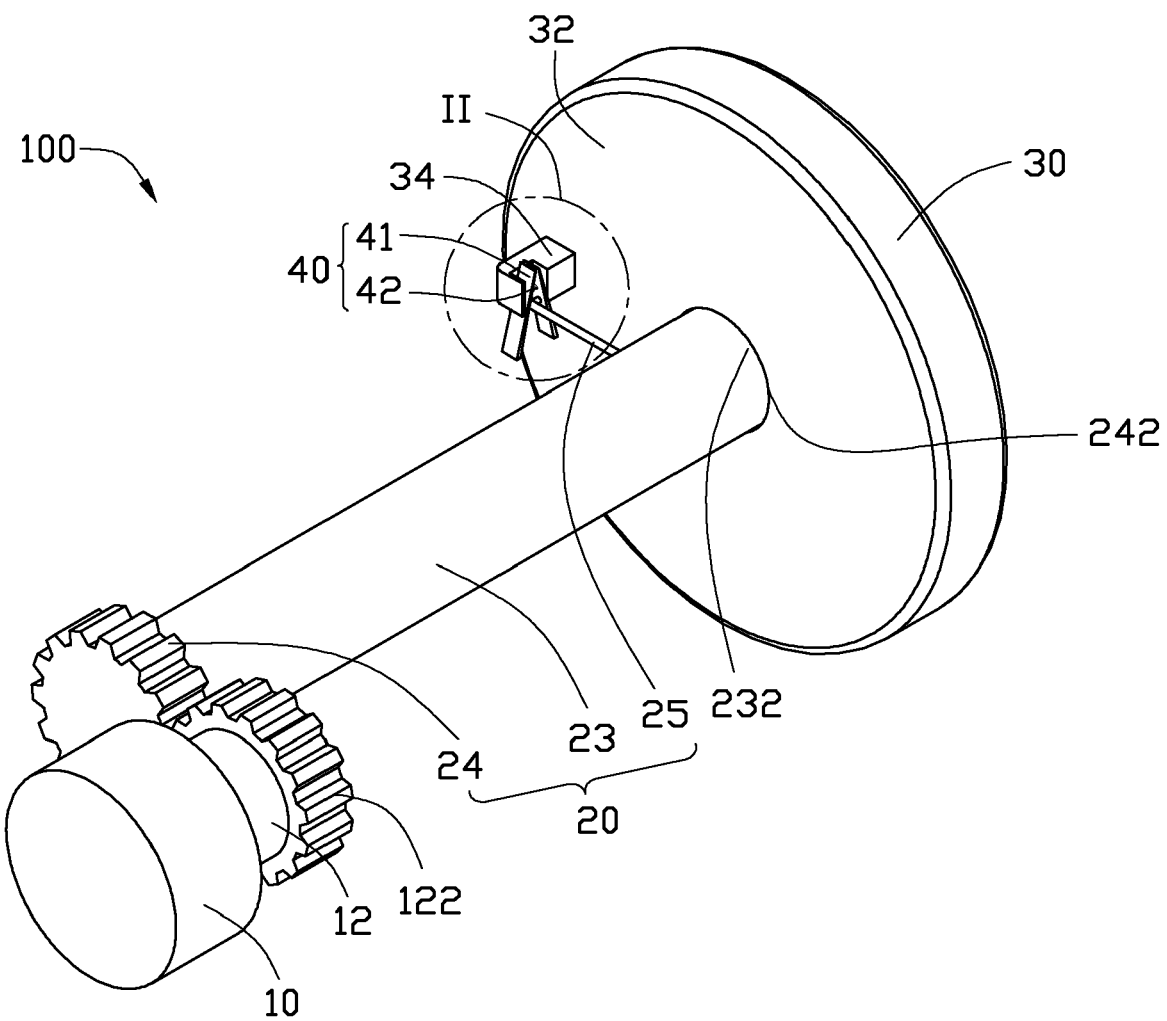
FIG. 1 is an isometric view of an exemplary embodiment of an overload protection device.
Figure 2:
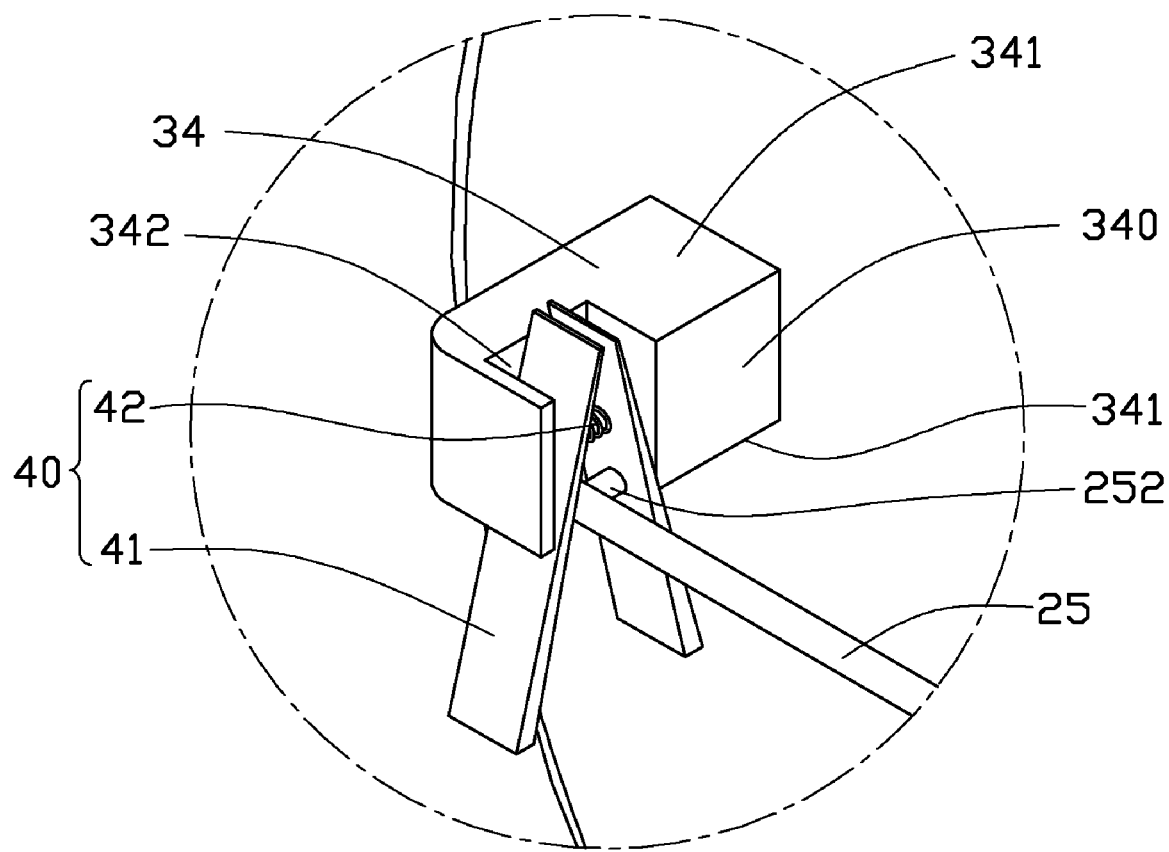
FIG. 2 is an enlarged view of section II of FIG. 1.

Referring to FIGS. 1-2, an overload protection device 100 according to an exemplary embodiment, is shown. The overload protection device 100 includes a motor 10, a rotatable shaft 20, a driven member 30, and a transmitting mechanism 40.

The motor 10 includes a rotor 12 with a first gear 122 formed on a distal end of the rotor 12. The motor 10 rotates the rotatable shaft 20 via the first gear 122. The motor 10 works normally when the power supplied is lower than the rated power of the motor 10. Once the power exceeds the rated power, the motor 10 becomes overloaded.

The rotatable shaft 20 includes a cylindrical rod 23, a second gear 24 formed at an end of the cylindrical rod 23 to mesh with the first gear 122, and a driving arm 25. The rod 23 includes a connection end 232 away from the first gear 122. In this embodiment, the driving arm 25 is an elongated circular handle and extends outwards from the connection end 232 radially. A connection pole 252 is formed on an end of the driving arm 25 that is far away from the rod 23. The connection pole 252 is substantially parallel to the rod 23.

The driven wheel 30 is substantially a circular plate and includes an inner surface 32 facing towards the rotatable shaft 20, a center hole 242, and a protrusion 34. The center hole 242 is defined in the center of the inner surface 32, and is configured for engaging with the connection end 232 of the cylindrical rod 23. The protrusion 34 is extends outwards from the inner surface 32, perpendicularly. The protrusion 34 has a first sidewall 340 facing the rotatable shaft 20, and two second sidewall 341 parallel to each other and adjacent to the first sidewall 340. A cutout 342 is defined in the first sidewall 340 and the two second sidewalls 341. The connection pole 252 is received in the cutout 342 and the width of the cutout 342 is slightly larger than the length of the connection pole 252.

The transmitting mechanism 40 includes a resilient member 42 and two arms 41 connected to opposite ends of the resilient member 42. The two arms 41 are also rotatably connected to opposite ends of the connection pole 252. In this embodiment, the resilient member 42 is a spring, the length of the resilient member 42 in a normal state is slightly smaller than the length of the connection pole 252. As a result, the two arms 41 and the resilient member 42 cooperatively form a wedge-shaped resilient structure having a narrow end and a broad end. The transmission mechanism 40 is therefore frictionally clamped in the cutout 342 with the broad end of the wedge-shaped resilient structure extended outside of the cutout 342.

In use, the motor 10 drives the rotatable shaft 20 to rotate. The driving arm 25 rotates together with the rotatable shaft 20 thereby, driving the driven wheel 30 to rotate by pushing the protrusion 34 with the transmission mechanism 40 wedged in the cutout 342. In other words, the torque generated by the motor 10 is transmitted to the driven wheel 30.

Figure 3:
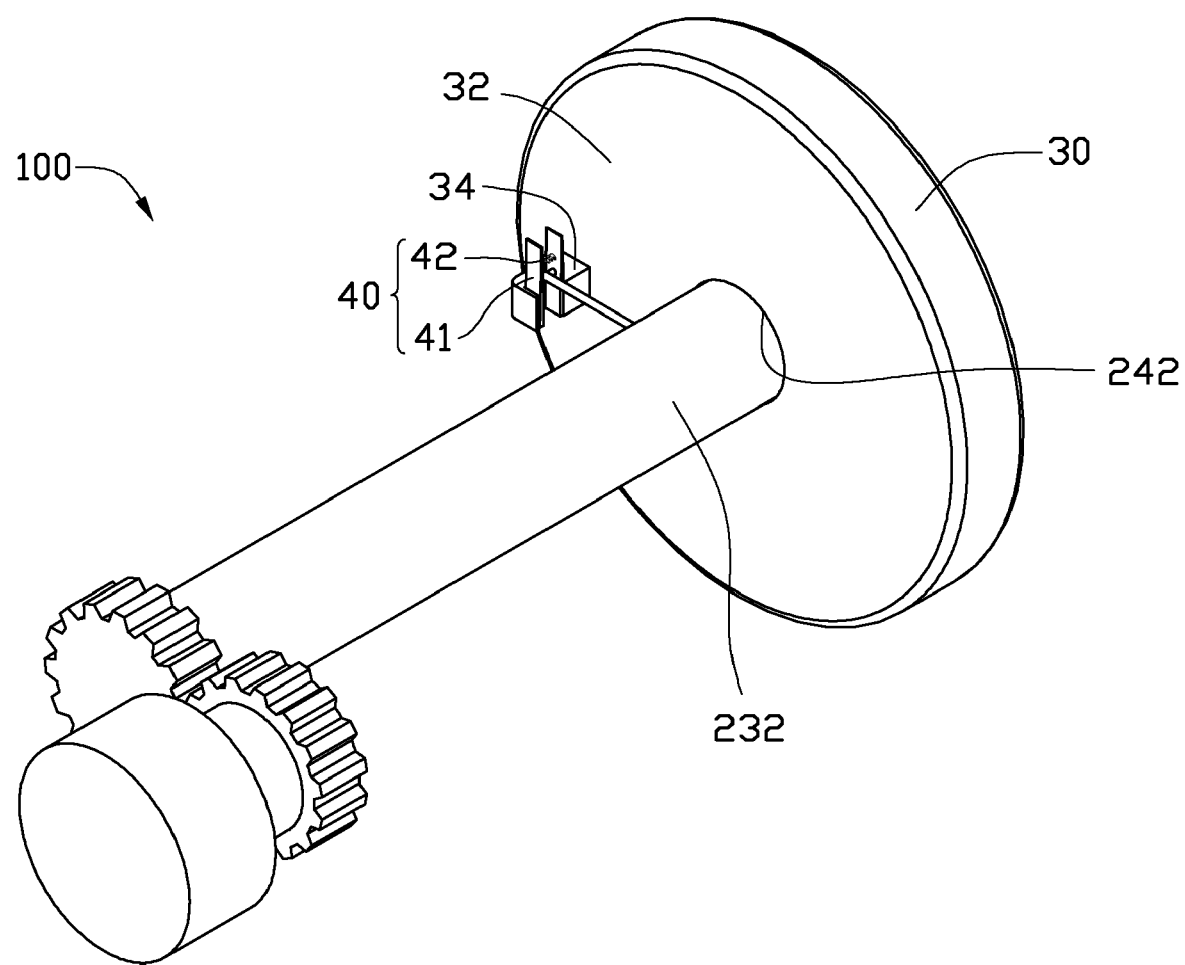
FIG. 3 is an isometric view of the overload protection device of FIG. 1, which is in an overloaded state.

Referring further to FIG. 3, if the motor 10 is operated in an overload condition, the drive force can not drive the driven wheel 30 to rotate following the rotatable shaft 20, thereby, the torque applied on the arms 41 by the drive force of the motor 10 becomes greater than the torque applied on the arms 41 by the resilient force of the resilient member 42. The resilient member 42 can no longer hold the transmission mechanism 40 in a wedge shape. The arms 41 become parallel each other to slide out of the cutout 342, and then the driven wheel 30 is unloaded from the motor 10 to decrease the load of the motor 10 to protect the motor 10 from being damaged.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An overload protection device comprising:
   a rotatable shaft driven by a motor comprising a rod and a driving arm extending outwards from the rod, a connection pole being formed on an end of the driving arm that is away from the rod;
   a driven wheel rotatably engaged with the rotatable shaft at a distal end of the rotatable shaft, the driven wheel comprising an inner surface facing towards the rotatable shaft and a protrusion extending outwards from the inner surface, the protrusion having a sidewall facing the rotatable shaft and a cutout being defined in the sidewall of the protrusion; and
   a transmitting mechanism comprising an resilient member and two arms connected to opposite ends of the resilient member and also rotatably connected to two opposite ends of the connection pole, and wedged in the cutout for driving the driven wheel to rotate following the rotatable shaft; wherein, when the motor is overloaded, the torque applied on the arms by the drive force of the motor becomes greater than the torque applied on the arms by the resilient force of the resilient member, the resilient member can no longer hold the transmission mechanism in a wedge shape, the arms become parallel each other to slide out of the cutout to protect the motor.

2. The overload protection device as claimed in claim 1, wherein the motor comprises a rotor with a first gear formed on a distal end of the rotor, the rotatable shaft further comprises a second gear formed on an end of the rod for meshing with the first gear.

3. The overload protection device as claimed in claim 2, wherein the rod comprises a connection end away from the first gear, and the driven wheel comprises a center hole defined in the center of the inner surface, the connection end is engaged with the center hole.

4. The overload protection device as claimed in claim 1, wherein the width of the cutout is slightly larger than the length of the connection pole, the connection pole is received in the cutout.

5. The overload protection device as claimed in claim 1, wherein the length of the resilient member in normal state is slightly shorter than the connection pole, the two arms and the resilient member are cooperatively formed a wedge-shaped resilient structure having a narrow end and a broad end disposed, and the transmission mechanism is wedged in the cutout with the broad end extended outside of the cutout.

6. The overload protection device as claimed in claim 1, wherein the resilient member is a spring.

7. The overload protection device as claimed in claim 1, wherein the connection pole is substantially parallel to the rod.

* * * * *